US012751886B2

(12) United States Patent
Petriaux et al.

(10) Patent No.: US 12,751,886 B2
(45) Date of Patent: Oct. 6, 2026

(54) METHOD FOR MOVING AN EXOSKELETON

(71) Applicant: WANDERCRAFT, Paris (FR)

(72) Inventors: Marine Petriaux, Paris (FR); Maxime Brunet, Paris (FR)

(73) Assignee: WANDERCRAFT, Paris (FR)

( * ) Notice: Subject to any disclaimer, the term of this patent is extended or adjusted under 35 U.S.C. 154(b) by 684 days.

(21) Appl. No.: 18/024,552

(22) PCT Filed: Sep. 8, 2021

(86) PCT No.: PCT/FR2021/051539

§ 371 (c)(1),
(2) Date: Mar. 3, 2023

(87) PCT Pub. No.: WO2022/053761

PCT Pub. Date: Mar. 17, 2022

(65) Prior Publication Data

US 2023/0355458 A1 Nov. 9, 2023

(30) Foreign Application Priority Data

Sep. 9, 2020 (FR) ........................................ 2009118

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *A61H 2003/007* (2013.01); (Continued)

(58) Field of Classification Search
CPC .. A61H 3/00; A61H 2201/0165; B25J 9/0006
See application file for complete search history.

(56) References Cited

U.S. PATENT DOCUMENTS

2005/0070834 A1* 3/2005 Herr .......................... A61F 2/70
602/28
2009/0227424 A1 9/2009 Hirata
(Continued)

FOREIGN PATENT DOCUMENTS

EP 2497610 A1 9/2012
EP 2497610 B1 * 10/2014 ........... B62D 57/032
(Continued)

OTHER PUBLICATIONS

Chinese Office Action in related Chinese Application No. 202180061906.2 mailed Mar. 31, 2025 (with English Translation).
(Continued)

*Primary Examiner* — Brandy S Lee
*Assistant Examiner* — Mishal Zahra Hussain
(74) *Attorney, Agent, or Firm* — Thomas | Horstemeyer, LLP

(57) ABSTRACT

The present invention relates to a method for moving a two-legged exoskeleton (1) receiving a human operator, the method comprising the implementation, by data processing means (11*c*) of the exoskeleton (1), of steps of: (a) obtaining a theoretical basic trajectory of the exoskeleton (1) corresponding to one step; (b) setting the parameters of the theoretical basic trajectory based on a single parameter so as to define the theoretical basic trajectory of the exoskeleton (1) as a virtual guide with a single degree of freedom; (c) in response to forced movements of the exoskeleton (1) made by the human operator, operating a controller defining the progression from an actual position of the exoskeleton (1) based on said single parameter by stimulating a spring-damper link between the exoskeleton (1) and the virtual guide so as to implement an actual basic trajectory close to the theoretical basic trajectory.

14 Claims, 3 Drawing Sheets

(52) U.S. Cl.
CPC ................ *A61H 2201/0165* (2013.01); *A61H 2201/164* (2013.01); *A61H 2201/165* (2013.01); *A61H 2201/5005* (2013.01); *A61H 2201/501* (2013.01)

(56) References Cited

U.S. PATENT DOCUMENTS

| | | | | |
|---|---|---|---|---|
| 2013/0226048 | A1* | 8/2013 | Unluhisarcikli ..... | A61H 1/0244 601/34 |
| 2017/0202725 | A1* | 7/2017 | Robertson .............. | A61H 1/024 |
| 2018/0092536 | A1* | 4/2018 | Sandler ................ | A61B 5/0024 |
| 2018/0141206 | A1 | 5/2018 | Bereziy | |
| 2019/0029914 | A1* | 1/2019 | Polygerinos ......... | A61H 1/0262 |
| 2019/0159954 | A1* | 5/2019 | Ozsecen ................ | B25J 9/0006 |

FOREIGN PATENT DOCUMENTS

| | | | |
|---|---|---|---|
| FR | 3101463 | | 4/2021 |
| JP | 2007275282 | A | 10/2007 |
| JP | 2010063813 | A | 3/2010 |
| KR | 1020180071198 | A | 6/2018 |
| KR | 20190114627 | A | 10/2019 |
| WO | 2015140352 | A1 | 9/2015 |
| WO | 2015140353 | A2 | 9/2015 |
| WO | 2019060791 | A1 | 3/2019 |

OTHER PUBLICATIONS

Japanese Office Action in related Japanese Application No. JP2003-515633, mailed Apr. 22, 2025 (with English Translation attached).
Susana Sanchez Restrepo, et al., “Iterative Virtual Guides Programming for Human-Robut Comanipulation”, HAL Archieves-ouvertes, HAL Id: hal-01763775, https://hal.archives-ouvertes.fr/hal-01763775, Submitted on Apr. 11, 2018.
Sai K. Banala, et al., Robot Assisted Gait Training with Active Leg Exoskeleton (ALEX), IEEE Transactions on Neural Systems and Rehabilitation Engineering, vol. 17, No. 1, Feb. 2009.
French Preliminary Report in related French Application No. FR 2009118, mailed Jun. 22, 2021.
PCT Search Report in related PCT Application No. PCT/FR2021/051539, mailed Nov. 19, 2021.
Office Action in related Korean Application No. 9-5-2025-095190603, mailed Sep. 30, 2025.

* cited by examiner

METHOD FOR MOVING AN EXOSKELETON

CROSS REFERENCE TO RELATED APPLICATIONS

This application is the 35 U.S.C. § 371 national stage application of PCT Application No. PCT/FR2021/051539, filed Sep. 8, 2021, which application claims the benefit of French Application No. FR 2009118 filed Sep. 9, 2020, both of which are hereby incorporated by reference herein in their entireties.

GENERAL TECHNICAL FIELD

The present invention relates to the field of robots of the exoskeleton type.

More specifically, it relates to a method for setting in motion an exoskeleton with a variable level of assistance.

STATE OF THE ART

Recently, assisted gait devices called exoskeletons appeared for people with major mobility problems, such as paraplegics, these are external robotic devices that the operator (the human user) "puts on" thanks to an attachment system that binds the movements of the exoskeleton to his own movements. Lower limb exoskeletons have multiple joints, usually at least at the knees and hips, to recreate the gait movement. Actuators allow moving these joints, which in turn make the operator move. An interface system allows the operator to give orders to the exoskeleton, and a control system transforms these orders into command for the actuators. Sensors generally complete the device.

These exoskeletons constitute an advance compared to wheelchairs because they allow the operators to stand up and walk. The exoskeletons are no longer limited by the wheels and can theoretically evolve in most non-flat environments: the wheels, unlike the legs, do not allow crossing significant obstacles such as steps, stairs, obstacles with a too great height, etc.

In addition to the recovery of mobility, the exoskeletons are very interesting in rehabilitation, particularly after neurological accidents such as strokes.

In general, the rehabilitation is carried out thanks to the know-how of physiotherapists and occupational therapists. Various activities are practiced to strengthen the limbs but especially to reaccustom the brain to giving electrical signals corresponding to coherent orders.

The exoskeleton is then used to guide the limbs of the patients to make them follow a predetermined trajectory. Indeed, alone, these patients do not perform the right movements, for example by advancing the torso to raise the knee. The exoskeleton drives the movement of the limbs of the patients while resisting the inappropriate movements.

"Assistance" refers to this force applied in favor of the appropriate movements and against the inappropriate movements. Mathematically, a level of assistance of 100% corresponds to a case in which no force is needed to move along the predetermined trajectory, and an assistance of 0% corresponds to a case in which there is no force applied for or against the movement.

It is understood that to help patients progress, the level of assistance must be gradually reduced to adapt to their progress.

In other words, it is desirable to have a variable level of assistance, which in practice is extremely complex from a mathematical point of view.

The basic solution is to provide several controllers each associated with a predetermined level of assistance, so as to have for example choices between four or five different levels of assistance. It is understood that such a solution is not very modular and especially that it remains heavy.

It was therefore proposed in the document *Robot Assisted Gait Training With Active Leg Exoskeleton* (*ALEX*), by Sai K. Banala, Seok Hun Kim, Sunil K. Agrawal, and John P. Scholz, *IEEE TRANSACTIONS ON NEURAL SYSTEMS AND REHABILITATION ENGINEERING*, VOL. 17, NO. 1, Feb. 2009, a solution of variable level of assistance in which the normal forces $F_n$ and the tangential forces $F_t$ are processed separately.

The normal forces are used to bring back the patient to the planned trajectory and apply only outside a band around the trajectory, and increase quadratically when the foot moves away from its desired position.

The tangential forces are used to help the patient perform the movement and apply only in a band close to the trajectory, are maximum on the trajectory and decrease linearly when moving away from it.

The level of assistance is varied by modifying coefficients applied to the forces.

This method is satisfactory, but remains on the one hand limited to a monitored planar displacement (ALEX is not a real exoskeleton but simply a prosthesis for a single leg fixed to a gantry that supports it), and on the other hand too simplistic from a mathematical point of view.

Indeed it is understood that the calculation of the forces depends only on the distance between the current position and the trajectory and absolutely not on the movement per se. It is necessary at all times to determine the point closest to the current position on the trajectory, and it is easy to imagine that if the trajectory is substantially circular, there is a risk of having problematic behavior.

Thus, this solution is absolutely not applicable to a real exoskeleton which would walk in an open space and which moreover must support its own weight. It would be desirable to have a new solution for setting in motion any exoskeleton with a variable level of assistance, which reliably and ergonomically allows the exoskeleton to walk.

PRESENTATION OF THE INVENTION

The present invention thus relates, according to a first aspect, to a method for setting in motion a bipedal exoskeleton receiving a human operator, the method comprising the implementation, by means for processing data of the exoskeleton, of steps of:

(a) obtaining a theoretical elementary trajectory of the exoskeleton corresponding to a step;

(b) parametrizing said theoretical elementary trajectory as a function of a single parameter, so as to define the theoretical elementary trajectory of the exoskeleton as a virtual guide with a single degree of freedom;

(c) in response to forced movements of the exoskeleton performed by the human operator, executing a controller defining the evolution of an actual position of the exoskeleton as a function of said single parameter by simulating a spring-damper connection between the exoskeleton and said virtual guide, so as to implement an actual elementary trajectory in the vicinity of said theoretical elementary trajectory.

According to advantageous and non-limiting characteristics:

The method comprises the repetition of steps (a) to (c) so as to make the exoskeleton walk through a succession of actual elementary trajectories each corresponding to a step.

The theoretical elementary trajectory obtained in step (a) starts from an initial position, step (c) comprising the determination of a final position of the exoskeleton at the end of said actual elementary trajectory, said final position being used as the initial position on the next occurrence of step (a).

Said spring-damper connection between the exoskeleton and said virtual guide is simulated in step (c) by assuming an elastic restoring force and an impedance force applied to said exoskeleton.

Said controller also assumes that an accompanying force tangential to said virtual guide is applied to the exoskeleton.

The elastic restoring force, the impedance force and/or the assistance force is a function of a given level of assistance of the exoskeleton.

Said controller also assumes that a force compensating for the weight of the exoskeleton is applied to the exoskeleton.

Said elastic restoring force is a function of a deviation between the actual position of the exoskeleton and a theoretical position of the exoskeleton along the virtual guide; and said impedance force is a function of a deviation between a derivative of the actual position of the exoskeleton and a derivative of the theoretical position of the exoskeleton along the virtual guide.

The position of the exoskeleton is defined by a vector of the joint positions of the actuated degrees of freedom of the exoskeleton.

Said controller defines the evolution of the position of the exoskeleton as a function of the evolution of said single parameter.

According to a second aspect, the invention relates to an exoskeleton comprising data processing means configured to implement a method, according to the first aspect, for setting in motion the exoskeleton.

According to a third aspect, the invention relates to a system comprising a server and the exoskeleton according to the second aspect, the server comprising data processing means configured to generate said theoretical elementary trajectory and provide it to the exoskeleton in step (a).

According to a fourth and a fifth aspect, the invention relates to a computer program product comprising code instructions for the execution of a method, according to the first aspect, for setting in motion an exoskeleton; and a storage means readable by a computer equipment on which a computer program product comprises code instructions for the execution of a method, according to the first aspect, for setting in motion an exoskeleton.

PRESENTATION OF THE FIGURES

Other characteristics and advantages of the present invention will appear upon reading the following description of one preferred embodiment. This description will be given with reference to the appended drawings in which.

DETAILED DESCRIPTION

Architecture

The present invention proposes a method for setting in motion an exoskeleton 1.

Figure 1:
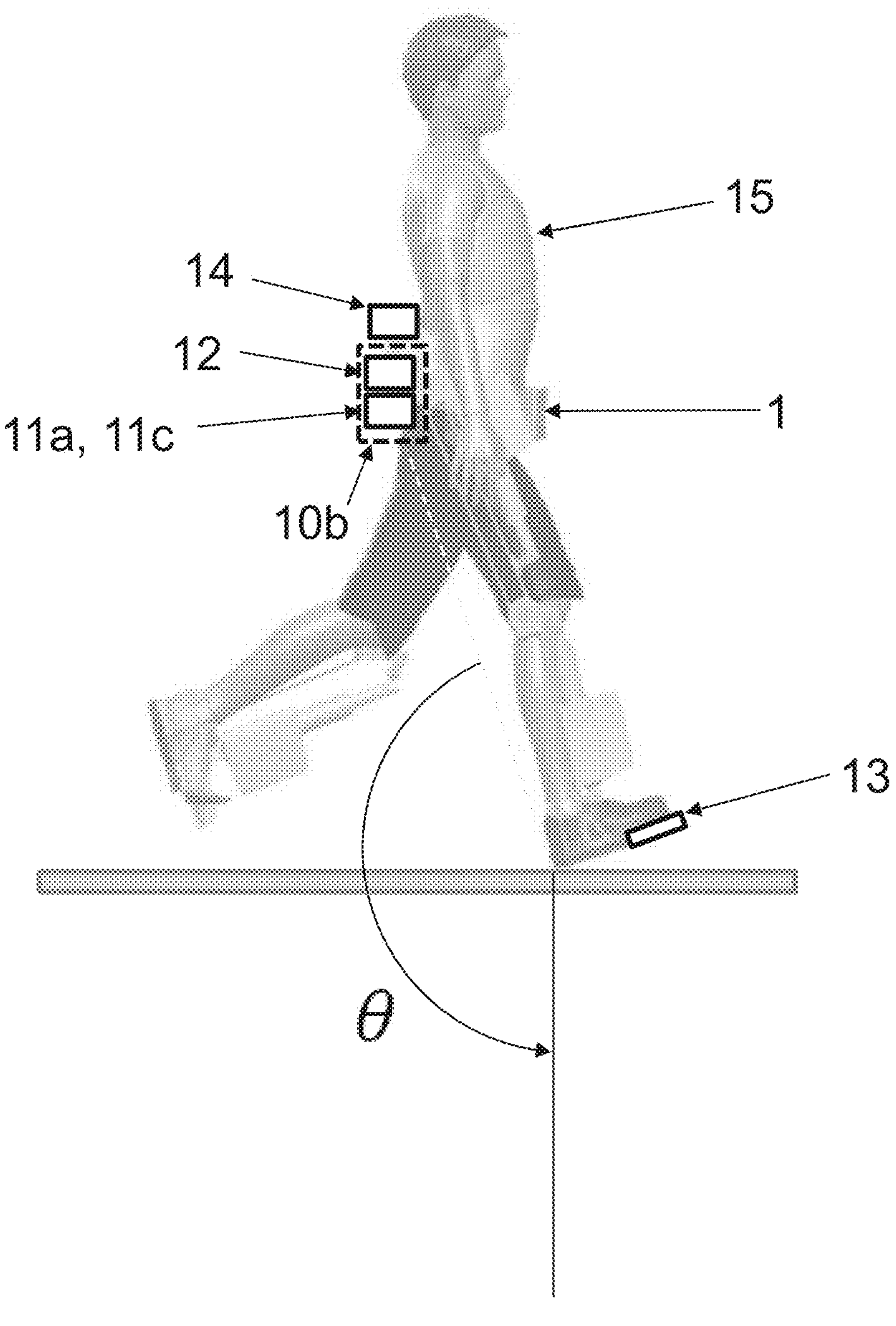
FIG. 1 is a diagram of an exoskeleton used by the methods according to the invention.

Referring to FIG. 1, said exoskeleton 1 is a jointed mechanical system of the bipedal robotic device type, actuated and controlled, provided with two legs, more precisely accommodating a human operator having his lower limbs each secured to a leg of the exoskeleton 1 (in particular thanks to straps). It can thus be a more or less humanoid robot. By "gait" it is meant here the setting in motion of the robotic device 1, which in practice translates into alternating bearing on the legs, in a standing position, so as to produce a displacement. As will be seen later, it is assumed that a movement of the exoskeleton is composed of a sequence of steps, each step consisting of a foot lifting off the ground then resting, before reversal of the roles (i.e. an alternation of steps of the left foot and the right foot).

The exoskeleton 1 has a plurality of degrees of freedom, that is to say deformable joints (generally via a rotation), that is to say movable relative to each other, which are each either "actuated" or "not actuated".

An actuated degree of freedom designates a joint provided with an actuator controlled by data processing means 11*c*, that is to say this degree of freedom is monitored and it is possible to act on it. On the contrary, a non-actuated degree of freedom designates a joint devoid of actuator, that is to say this degree of freedom follows its own dynamics and the data processing means 11 cannot directly monitor it (but a priori indirectly monitor it via the other actuated degrees of freedom).

The present exoskeleton naturally comprises at least two actuated degrees of freedom, preferably a plurality of them.

In the present case, the exoskeleton 1 has, as explained, a variable level of assistance, that is to say the operator can by his movements "actuate" the degrees of freedom himself insofar as the level of assistance allows it, i.e. modify the orientation of a joint himself, for example bend the knee. As such, the actuators are advantageously also sensors, in that they are capable of tracing back their position to the data processing means 11*c* so as to be able to detect the "forced" actuation of a degree of freedom by the operator.

The data processing means 11*c* designate a computer equipment (typically a processor, namely external if the exoskeleton 1 is "remotely controlled" but preferentially embedded in the exoskeleton 1, see below) adapted to process instructions and generate commands for the different actuators. These can be electric, hydraulic actuators, etc.

The present application will not be limited to any architecture of exoskeleton 1, and the example as described in the applications WO2015140352 and WO2015140353 will be considered.

Thus, preferably and in accordance with these applications, the exoskeleton 1 comprises on each leg a foot structure comprising a support plane on which a foot of a leg of the person wearing the exoskeleton can bear.

This support plane comprises a front platform and a rear platform, such that a foot pivot link connects the front platform to the rear platform, constituting a non-actuated degree of freedom.

The person skilled in the art will however be able to adapt the present method to any other mechanical architecture.

Figure 2:
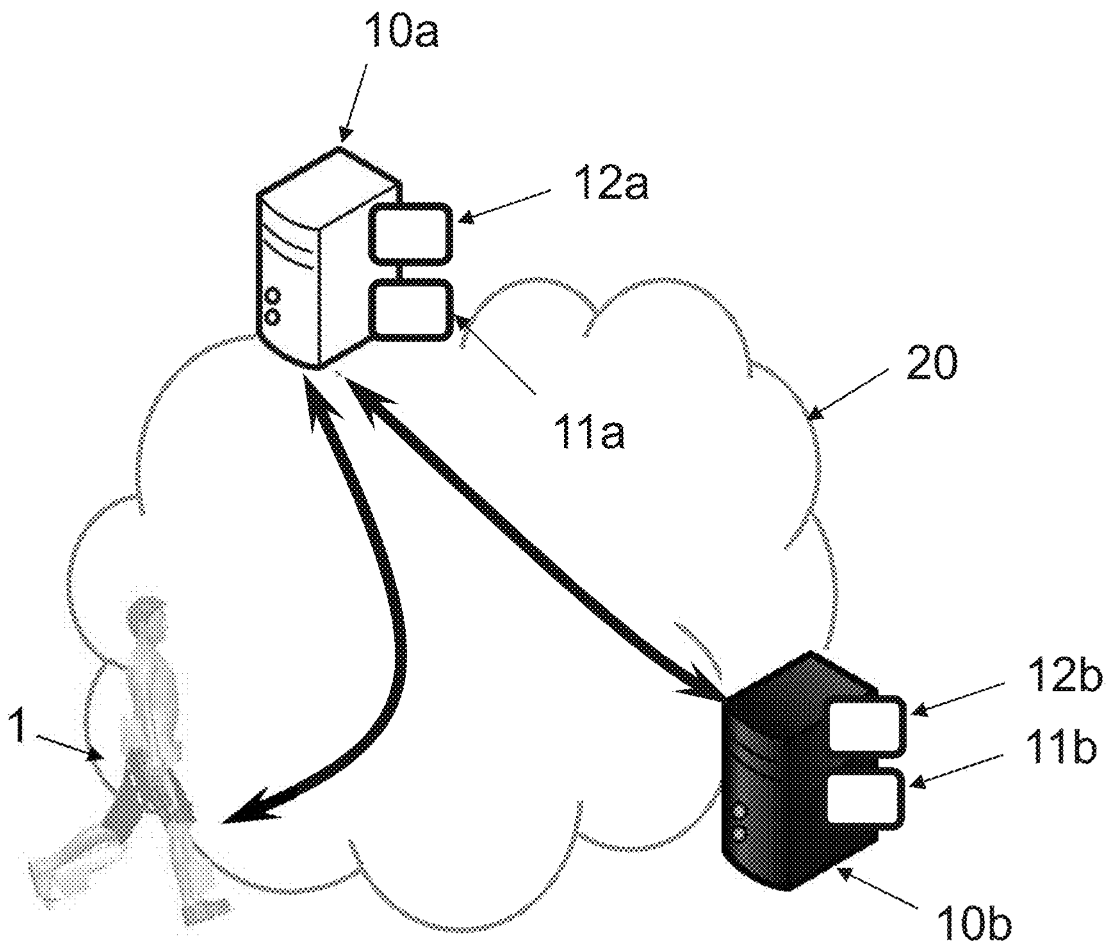
FIG. 2 is a diagram of an architecture for the implementation of the methods according to the invention.

According to one preferred embodiment, the present trajectory generation and gait method can involve a first or a second server 10*a*, 10*b* within an architecture as represented by FIG. 2.

The first server 10$a$ is a trajectory generation server, and the second server 10$b$ is a possible learning server.

Indeed, the generation of a trajectory of the exoskeleton 1 can use a neural network, particularly of the Feedforward Neural Network (FNN) type, as proposed in the application FR1910649. The second server 10$b$ is then a server for the implementation of a method for learning parameters of said neural network. It should be noted that the present method is not limited to the use of a neural network, and it will be possible to use any known technique for generating the trajectory in its entirety, see below.

In any case, it is quite possible that these two servers are combined, but in practice the second server 10$b$ is most often a remote server whereas the first server 10$a$ can be embedded by the exoskeleton 1 for real-time operation, as represented by FIG. 2. According to one preferred embodiment, the first server 10$a$ implements the method for generating a trajectory of the exoskeleton 1 thanks to a neural network using the parameters recovered from the second server 10$b$, and the exoskeleton 1 normally applies directly said trajectory generated in situ in order to be set in motion.

Each of these servers 10$a$, 10$b$ is typically a computer equipment connected to a wide area network 20 such as the Internet network for the exchange of the data, even if in practice once the neural network has been learned and embedded on the second server 10$b$, the communication can be interrupted, at least intermittently. Each comprises data processing means 11$a$, 11$b$ of the processor type (particularly the data processing means 11$b$ of the second server have a high computing power, because the learning is long and complex compared to the simple use of the learned neural network), and where appropriate data storage means 12$a$, 12$b$ such as a computer memory, for example a hard disk. In the case of a trajectory generation by a neural network, a learning database can be stored by the memory 12$b$ of the second server 10$b$.

It will be understood that there can be a plurality of exoskeletons 1 each embedding their first server 10$a$ (which can then be of limited power and space requirement, insofar as it only generates trajectories for the exoskeleton 1 to which it is dedicated), or a plurality of exoskeletons 1 each connected to a more powerful first server 10$a$ and possibly combined with the second server 10$b$ (and having the ability to generate trajectories on the fly for all the exoskeletons 1).

Trajectory

As explained, it is conventionally meant by "trajectory" of the exoskeleton the evolutions of each degree of freedom (particularly actuated) expressed as a function of time or of a phase variable. In the remainder of the present description, it will be meant by "position" of the exoskeleton 1 the joint positions of the actuated degrees of freedom, which are advantageously six in number per leg, namely a position defined by a vector of dimension 12, even it would be for example possible to take the Cartesian position of a characteristic point of the exoskeleton, for example its CMP (there is then a vector of dimension 6: 3 positions plus 3 orientations along the 3 axes). It should be noted that the 12 degrees of freedom solution is preferable because there is redundancy and therefore it forces the operator to adopt good joint coordination.

Furthermore, it is known how to define a "complex" movement as a sequence of trajectories called "elementary" trajectories, where appropriate interspersed with transitions. By elementary trajectory, it is meant any trajectory corresponding to a step, i.e. applied over the duration of the step so that starting from an initial state of the exoskeleton 1 at the start of a step (moment of contact of the foot), there is a return to the same state at the start of the next step. It should be noted that there is an alternation of left step and right step, so that the state at the end of a step is "symmetrized" (it is no longer the same foot in front), and it technically takes two steps to return exactly in the same state (same foot in front). A stable succession of elementary trajectories allowing the gait is called periodic trajectory.

This encompasses any flat gait, but also on a ramp, an ascent or a descent of stairs, etc.).

An elementary trajectory is associated with a given gait of the exoskeleton 1 (a gait being defined by an n-tuple of gait parameters), and allows maintaining this gait in a stable and feasible way (i.e. as will be seen complies with all the constraints of an optimization problem and minimizes a cost function as much as possible). As explained, said gait parameters correspond to "characteristics" of the way of walking, such as the length of the steps, the gait frequency and the inclination of the chest, but also the height of the steps when going up and down stairs, the instantaneous angle of rotation for the curved movements; and also to morphological characteristics of the operator (a subgroup of the gait parameters called patient parameters) such as his height, his weight, the length of the thighs or of the shins, the position of the center of mass (value of the shift forward) and the lateral travel of the chest in the context of rehabilitation activity.

Said "constraints" of a gait that are mentioned above can be varied and depend on the type of gait desired, for example a "flat foot" gait or a gait with a "roll", etc. The present method will not be limited to any desired type of gait.

Any transitions correspond to gait changes, i.e. variations in the values of said gait parameters (for example an increase in the step length): knowing an initial set of gait parameters and a final set of gait parameters, and therefore an initial periodic trajectory (associated with the initial set of gait parameters) and a final periodic trajectory (associated with the final set of gait parameters), said transition is a fragment of trajectory making it possible to switch from the initial periodic trajectory to the final trajectory. It should be noted that there must be "initial" or "final" transitions, corresponding to a starting and an end of the movement.

Method

Figure 3:
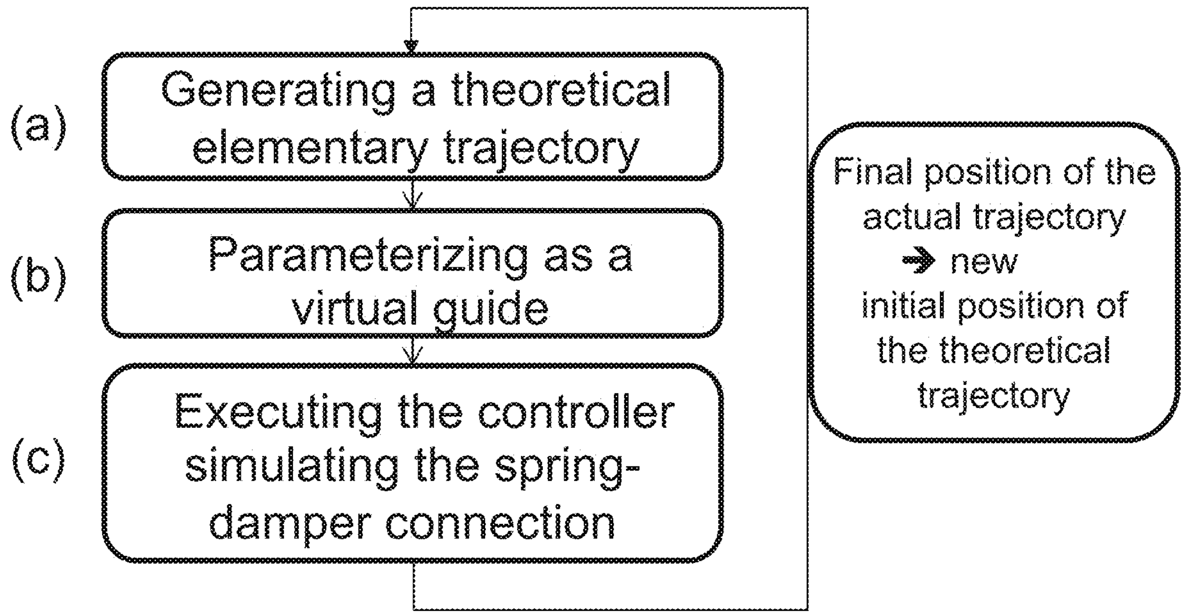
FIG. 3 is a diagram illustrating one preferred embodiment of the method according to the invention.

Referring to FIG. 3, said method for setting in motion the exoskeleton 1, implemented by the embedded data processing means 11$c$, begins with a step (a) of obtaining a theoretical elementary trajectory of the exoskeleton corresponding to a step. This step can comprise the prior acquisition of at least one n-tuple of gait parameters defining a given gait of the exoskeleton 1, or a sequence of n-tuples of gait parameters gradually (for example due to new commands from the operator of the exoskeleton or from a therapist, in particular if the exercise changes).

It should be noted that the acquisition can, as explained, directly involve the generation of the trajectory by the exoskeleton 1 (if for example it embeds the server 10$a$) or the simple receipt of the trajectory by the network 20. As such, the means 11$c$ can provide the external server 10$a$ with the gait parameters, and recover the trajectory in return.

It should be noted that a theoretical periodic trajectory which goes further than a single step is most often directly generated, the theoretical elementary trajectory is just a fragment of it.

Preferably, a level of assistance of the exoskeleton is defined. As explained, it is advantageously a value between 0 and 1, 0 designating zero assistance and 1 designating total assistance, even if it is possible to use any scale, a plurality of predefined levels, etc. Again, the level of assistance may vary. It will only be assumed that the level of assistance is such that forced movements of the exoskeleton 1 performed by the human operator are in practice possible, the exoskeleton 1 not blocking them.

It should be noted that the operator can be provided, as explained, with a vest of sensors 15 that allows detecting the configuration of his chest (the orientation of the latter). The direction in which the operator orients his chest is the one in which he wishes to walk and the speed is given by the intensity with which he puts his chest forward (how much he leans). The starting request can correspond to when the operator presses a button (or a particular posture) indicating his intention to start up and therefore ordering the data processing means to determine said parameters. Some parameters such as the instantaneous angle of rotation or the height of the steps when going up or down stairs can be predetermined or obtained by means of other sensors 13, 14.

For the generation of the trajectory strictly speaking, there will be no limitation to any known technique. As explained, optimization tools, capable in particular of generating a given trajectory according to the constraints and to the selected gait parameters, are known in particular, For example, in the case of HZD trajectories, the problem of the generation of the trajectories is formulated as an optimal monitoring problem which can be solved preferably by an algorithm called direct collocation algorithm, see the document Omar Harib et al., *Feedback Control of an Exoskeleton for Paraplegics Toward Robustly Stable Hands-free Dynamic Walking.*

A neural network trained on a database of learning trajectories can also be used alternatively as explained.

In all cases, it will be assumed that an initial position of the exoskeleton 1 corresponding to its position at the start of the step has been defined.

The elementary trajectory generated is called "theoretical" trajectory, as opposed to an "actual" trajectory. Indeed, in a conventional operation of the exoskeleton 1 without use in rehabilitation, it will be simply possible to apply the theoretical trajectory and the exoskeleton would walk automatically in accordance with this trajectory.

Here, with the aim of training the operator, it is repeated that forced movements of the exoskeleton 1 performed by the human operator are in practice possible, so that the trajectory which is in practice performed by the exoskeleton 1 (the actual trajectory) never corresponds exactly to the planned theoretical trajectory, even if, as will be seen, the present method makes that they will remain close. It is therefore understood that said actual trajectory is consistent with the movements of the operator. To reformulate again, the actual trajectory can be executed at a speed freely chosen by the human operator, according to his movements.

Then, in a step (b), the method comprises the parametrization of said theoretical elementary trajectory as a function of a single parameter, so as to define the theoretical elementary trajectory of the exoskeleton 1 as a virtual guide with a single degree of freedom.

The idea of virtual guides is well known in cobotics, and described for example in the document *Iterative Virtual Guides Programming for Human-Robot Comanipulation*, Susana Sanchez Restrepo, Gennaro Raiola, Pauline Chevalier, Xavier Lamy and Daniel Sidobre. These virtual guides are for example "barriers" limiting the movement of effector robots, particularly for safety reasons.

For example, the robot can be a robotic arm terminated by a circular saw manipulated by a human operator, the theoretical trajectory is a cutting trajectory, and the virtual guide prevents the operator from being injured if he gets too far from the trajectory.

As will be seen, the virtual guide cleverly adapts to the problem of assistance with an exoskeleton.

Mathematically, there is defined a first pair $\{x_{vm}; \dot{x}_{vm}\}$ of the theoretical position of the exoskeleton 1 and of the derivative of the theoretical position of the exoskeleton 1 (when the theoretical elementary trajectory is covered), and a second pair $\{x; \dot{x}\}$ of the actual position of the exoskeleton 1 and of the derivative of the actual position of the exoskeleton 1 (when the actual elementary trajectory is covered). Here "vm" means virtual mechanism because it is possible to see the exoskeleton 1 following the theoretical trajectory as a "virtual mechanism" sliding along the virtual guide. In other words, $x_{vm}$ is the theoretical position of the exoskeleton 1 along the virtual guide. It is repeated that all objects x, $x_{vm}$, $\dot{x}$ and $\dot{x}_{vm}$ are vectors, preferably of dimension 12.

Insofar as, in the space of positions of the exoskeletons, the virtual guide forms an object of dimension 1 (a curve), it can be parametrized with a single parameter denoted $s_{vm}$. This parameter can be the time, but preferably it is the curvilinear abscissa along the virtual guide, for example with a value of 0 when the exoskeleton is in the initial position, and a value of 1 when it is in a final position corresponding to the end of the step (the raised leg reaches the ground).

$x_{vm}=L_s(s_{vm})$ and $\dot{x}_{vm}=J_s(\dot{s}_{vm})$ can be set, where $L_s$ is the parametrization model and $J_s$ is the Jacobian of the virtual mechanism, so as to define its kinematic model. The person skilled in the art will know how to implement this parameterization, for example on the basis of the document *Iterative Virtual Guides Programming for Human-Robot Comanipulation*, Susana Sanchez Restrepo, Gennaro Raiola, Pauline Chevalier, Xavier Lamy and Daniel Sidobre.

In a main step (c), in response to forced movements of the exoskeleton 1 performed by the human operator (i.e. the operator will try himself to implement the exoskeleton 1 in accordance with the planned trajectory, particularly under the monitoring of the therapist), the means 11*c* execute a controller defining the evolution of an actual position of the exoskeleton 1 as a function of said single parameter by simulating a spring-damper connection between the exoskeleton 1 and said virtual guide, so as to implement an actual elementary trajectory in the vicinoty of said theoretical elementary trajectory.

This controller can of course be prepared in advance and loaded onto the exoskeleton 1.

The "spring-damper connection" mentioned is a physical analogy illustrating the idea that the exoskeleton 1 would be attached to the virtual guide by a spring and a damper in parallel: as long as the actual trajectory implemented by the user is close to the theoretical trajectory nothing happens, but as soon as he moves away from it the forces of the spring and of the damper are taken into account.

Preferably, said spring-damper connection between the exoskeleton 1 and said virtual guide is simulated in step (c) by assuming an elastic restoring force (the spring) and an impedance force (the damper) applied to said exoskeleton 1.

Particularly, said elastic restoring force is a function of a deviation between the actual position x of the exoskeleton 1 and the theoretical position $x_{vm}$ of the exoskeleton 1 along the virtual guide (advantageously according to the formula $F_1=K(x_{vm}-x)$, where K is a stiffness coefficient which can be a function of the level of assistance) and said impedance force is a function of a deviation between the derivative $\dot{x}$ of the actual position of the exoskeleton 1 and the derivative $\dot{x}_{vm}$ of the theoretical position of the exoskeleton 1 along the virtual guide (advantageously according to the formula $F_2=B(\dot{x}_{vm}-\dot{x})$, where B is a damping coefficient which can also be a function of the level of assistance).

The idea is to list the forces applied to the exoskeleton 1, and to determine its first order dynamics with respect to said single parameter $s_{vm}$, so that said controller (particularly in the form of a PD controller) defines the evolution of the actual position x of the exoskeleton 1 as a function of the evolution of said single parameter.

Are advantageously added:

- an accompanying force $F_3$ tangential to said virtual guide and of an intensity as a function of said level of assistance (for example $F_3=N\dot{x}_{vm}$. It should be noted that some degrees of freedom can be compensated further, for example the frontal and transverse hips are not very mobilizable and they can be assisted more so that they are not blocking, i.e. N can be a diagonal matrix with varied coefficients also potentially as a function of the level of assistance and/or of the weight of the operator);
- a force $F_4$ compensating for the weight of the exoskeleton ($F_4=-P$)

There is then $J_s^T(F_1+F_2+F_3+F_4)=0$, which equation can be solved with respect to $\dot{s}_{vm}$, then integrated, so as to know the evolution of the actual position x of the exoskeleton 1 as a function of the evolution of said single parameter $s_{vm}$.

In summary, the operator is assisted by $F_3$, does not have to support the weight of the exoskeleton thanks to $F_4$, and is brought back to the theoretical trajectory by $F_1$ and this in a flexible way by $F_2$.

Compared to the ALEX solution mentioned in the introduction, there is no distance to calculate and there is a universal method.

Chain of Steps

Steps (a) to (c) can be repeated so as to make the exoskeleton 1 walk through a succession of actual elementary trajectories each corresponding to a step.

It must be kept in mind that the actual trajectory is different from the theoretical trajectory, so that the following trajectory must be adapted to the step that has just taken place.

Thus, the theoretical elementary trajectory obtained in step (a) starts from an initial position, step (c) advantageously comprising the determination of a final position of the exoskeleton 1 at the end of said actual elementary trajectory, said final position being used as the initial position at the next occurrence of step (a).

As explained, a complete periodic trajectory is generally generated (made up of a series of elementary trajectories), so that the new occurrence of step (a) consists in modifying the periodic trajectory (for the next elementary trajectory).

In other words, there is therefore an interpolation between the position of the exoskeleton 1 at the moment of impact and the next step, in order to avoid jumping instructions. The interpolation is performed at the moment of impact, and modifies the beginning of the trajectory of the next step. The virtual guide is then "moved" (new occurrence of step (b)) to correspond to the current position and to be able to start the next step on a good basis.

Pieces of Equipment and System

According to a second aspect, the invention relates to the exoskeleton 1, for the implementation of the method according to the first aspect, and according to a third aspect, the system comprising the exoskeleton as well as a possible server 10*a*, possibly combined.

The exoskeleton 1 comprises data processing means 11*c* configured for the implementation of the method according to the second aspect, as well as, if necessary, data storage means 12 (particularly those of the first server 10*a*), inertial measurement means 14 (inertial unit), means for detecting the impact of the feet on the ground 13 (contact sensors or possibly pressure sensors), and/or a vest of sensors 15.

It has a plurality of degrees of freedom including at least one degree of freedom actuated by an actuator controlled by the data processing means 11*c* for the execution of said controller.

The first server 10*a* comprises data processing means 11*a* for generating said theoretical elementary trajectory and providing it to the exoskeleton in step (a), particularly upon receipt of the initial position of the exoskeleton 1 at the start of the step and any gait parameters.

Computer Program Product

According to a third and a fourth aspect, the invention relates to a computer program product comprising code instructions for the execution (on the processing means 11*c*) of a method, according to the first aspect, for setting in motion an exoskeleton 1, as well as storage means readable by a computer equipment on which there is this computer program product.

The invention claimed is:

1. A method for setting in motion a bipedal exoskeleton receiving a human operator and having a plurality of actuated degrees of freedom, each formed by a joint provided with an actuator, the method comprising the implementation, by a processor of the exoskeleton, of steps of:

(a) obtaining a theoretical elementary trajectory of the exoskeleton corresponding to a step, the theoretical elementary trajectory defining an evolution of a theoretical position of the exoskeleton, the theoretical position being defined by a vector of theoretical values of a plurality of position parameters of the exoskeleton;

(b) parameterizing said theoretical elementary trajectory as a function of a single parameter, so as to define the theoretical elementary trajectory of the exoskeleton as a virtual guide with a single degree of freedom;

(c) in response to forced movements of the exoskeleton performed by the human operator, executing a controller deriving from an actual position of the exoskeleton, defined by a vector of actual values of the position parameters, a corresponding theoretical position of the exoskeleton along the virtual guide and determining a command for the actuators to apply a force to the exoskeleton simulating a spring-damper connection between the actual position of the exoskeleton and said corresponding theoretical position along the virtual guide, so as to implement an actual elementary trajectory in the vicinity of said theoretical elementary trajectory.

2. The method according to claim 1, comprising repeating steps (a) to (c) so as to make the exoskeleton walk through a succession of actual elementary trajectories each corresponding to a step.

3. The method according to claim 2, wherein the theoretical elementary trajectory obtained in step (a) starts from an initial position, step (c) comprising determining a final position of the exoskeleton at an end of said actual elementary trajectory, said final position being used as initial position on a next occurrence of step (a).

4. The method according to claim 1, wherein said spring-damper connection is simulated by the controller assuming an elastic restoring force and an impedance force applied to said exoskeleton.

5. The method according to claim 4, wherein said controller also assumes that an accompanying force tangential to said virtual guide is applied to the exoskeleton.

6. The method according to claim 5, wherein an intensity of at least one of the elastic restoring force, the impedance force and the accompanying force is a function of a level of assistance of the exoskeleton that can be varied by the human operator.

7. The method according to claim 4, wherein said controller also assumes that a force compensating for the weight of the exoskeleton is applied to the exoskeleton.

8. The method according to claim 4, wherein said elastic restoring force is a function of a deviation between the actual position of the exoskeleton and the corresponding theoretical position of the exoskeleton along the virtual guide; and said impedance force is a function of a deviation between a derivative of the actual position of the exoskeleton and a derivative of the corresponding theoretical position of the exoskeleton along the virtual guide.

9. The method according to claim 1, wherein the position parameters of the exoskeleton are joint positions of the actuated degrees of freedom of the exoskeleton.

10. An exoskeleton comprising a processor configured to implement a method according to claim 1 for setting in motion the exoskeleton.

11. A system comprising a server and the exoskeleton according to claim 10, the server comprising a processor configured to generate said theoretical elementary trajectory and provide it to the exoskeleton in step (a).

12. A computer program product comprising code instructions for the execution of the method according to claim 1 for setting in motion an exoskeleton, when said computer program product is executed on a computer.

13. A memory readable by a computer equipment in which a computer program product is stored, the computer program product comprising code instructions for the execution of the method according to claim 1 for setting in motion an exoskeleton.

14. The method according to claim 1, wherein the single parameter is a curvilinear abscissa along the virtual guide.

* * * * *